Aug. 15, 1967  J. O. NELSON  3,335,609
PULSATION DAMPENED PRESSURE GAUGE
Filed April 6, 1965

INVENTOR.
JORD O. NELSON
BY Zulwider, Patton Rieber,
Lee, and Utecht
ATTORNEYS

United States Patent Office 3,335,609
Patented Aug. 15, 1967

3,335,609
PULSATION DAMPENED PRESSURE GAUGE
Jord O. Nelson, Paramount City, Calif., assignor to
Eltra Corporation, Toledo, Ohio
Filed Apr. 6, 1965, Ser. No. 445,932
1 Claim. (Cl. 73—414)

The present invention relates to pressure gauges, and more particularly to a novel pulsation dampening mechanism in combination with a Bourdon tube-type gauge which averages the gauge reading and prevents excessive shock and wear on the indicating needle bearing support and linkage means.

Bourdon tube pressure gauges generally include an arcuate piece of flexible metal tubing having a closed end, a pressure indicating needle, and a mechanism for transmitting motions of the closed end of the tube to the gauge needle. The fluid being monitored is supplied to the open end of the Bourdon tube. As the pressure of the fluid increases, the tube expands and straightens. This movement is transmitted by the mechanism to the needle to provide an accurate indication of the pressure of the fluid. Similarly, when the pressure drops, the tube contracts and returns to its curved shape causing a corresponding movement of the pressure gauge needle. For relatively slowly varying pressures, conventional Bourdon tube gauges provide an accurate and reliable measurement of fluid pressure. However, for oscillating or surging pressures, the accuracy of the gauge is completely lost because the needle oscillates and cannot be read. In particular, when a fluctuation in fluid pressure occurs, the Bourdon tube rapidly expands or contracts to follow the pressure changes. This rapid movement of the tube produces oscillations of the tube, mechanism, and gauge needle. The oscillations of the needle make it impossible to accurately read the fluid pressure and also places undesired strains and wear upon the mechanism.

In view of the foregoing problems, it is a major object of the present invention to provide a pressure gauge which protects the needle mechanism from shock and wear and which in fact is ideally suited to measuring oscillating or fluctuating fluid pressures.

Another object of the present invention is to provide a Bourdon tube pressure gauge in which the actuating mechanism is dampened to provide average pressure indications under fluctuating pressure conditions.

A further object of the present invention is to provide a Bourdon tube gauge of the foregoing type wherein the damping mechanism is particularly suited to handle high frequency oscillations, and is dependable and long wearing.

Still another object of the present invention is to provide a pressure gauge of the foregoing type which is particularly adapted for high pressure usage and which is also inexpensive to manufacture and maintain.

The foregoing, as well as other objects and advantages of the present invention, may be more clearly understood by reference to the following detailed description when taken with the drawing which illustrates, by way of example only, one form of Bourdon tube pressure gauge embodying the features of the invention.

Figure 1:
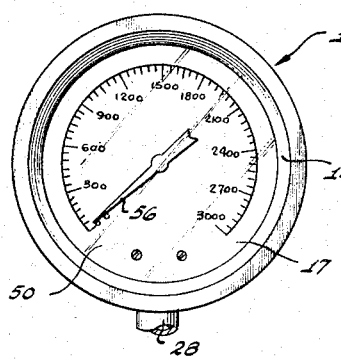
FIGURE 1 is a front view of the Bourdon tube pressure gauge.

Generally speaking, the pressure gauge of the present invention includes a deformable pressure sensing element for sensing fluid pressure. Various forms of sensing elements may be employed, such as deformable diaphragms or expandable bellows. Preferably, however, the sensing element takes the form of a Bourdon tube having a closed end and an open end for receiving fluid being monitored. Although shown as a C-shaped tube, the invention can also be used with helical or other shapes of Bourdon tubes. The gauge also includes a gauge needle carrying shaft and a transmission mechanism for transmitting motion of the closed end of the Bourdon tube to the shaft. The transmission, however, differs from conventional mechanisms in that it includes a loose linking coupling to the Bourdon tube which allows a predetermined amount of relatively free movement between the tube and the transmission. Further, damping means is carried by the shaft to oppose and dampen rotary movement of the shaft and transmission mechanism.

In practice, it has been found that the damping means and loose linkage coupling coact with the transmission mechanism and Bourdon tube to prevent the occurrence of undesired oscillations in the mechanism and shaft in response to fluctuations in fluid pressure applied to the Bourdon tube. Accordingly, the gauge gives an average reading of a fluctuating pressure and is protected against shocks and wear produced by the pressure variations which in conventional Bourdon tube gauges prevent accurate reading of the gauge, and cause excessive wearing of the moving parts of the gauge.

Referring more specifically to the drawing, the gauge is represented generally by the number 10 and includes a cup-shaped case 12 having a transparent front cover 17 enclosing a chamber having an inlet opening 16 in its bottom. The chamber 14 of the case is sealed by the glass 17 to prevent the escape of a fluid 18, such as hydraulic fluid or a more viscous damping fluid, which fills the case to cover and dampen movement of the moving parts of the gauge. To this end, the outer rim 19 of the case 12 is threaded and receives a ring 20 having a centrally extending flange 22. The glass 17 is stationed between the flange 22 and the front of the case. By proper adjustment of the ring 20, the flange engages the front of the glass and presses the glass against the front of the case to compress an O-ring 24 stationed around the open front 14, thereby creating an airtight seal between the glass and the case.

The bottom opening 16 in the case 12 is also sealed to prevent fluid leakage and in addition provides an entrance for a stem 28 to carry the fluid being monitored to a Bourdon tube 26 stationed within the case.

Figure 3:
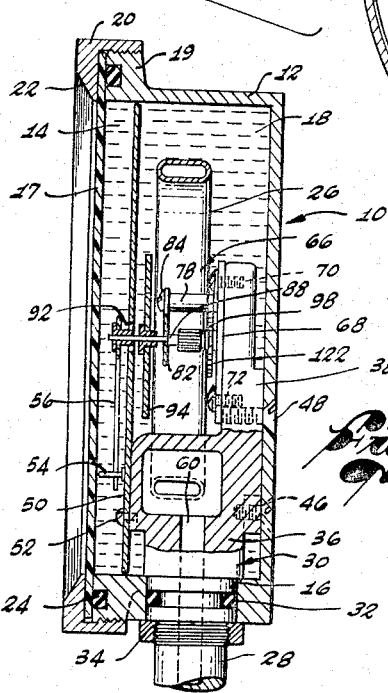
FIGURE 3 is a sectional side view of the gauge taken along the line 3—3 in FIGURE 2.

More particularly, as best seen in FIGURE 3, the stem 28 forms an integral part of a socket member 30 and is sealed within the opening 16 by means of an O-ring 32 seated within an annular groove around the stem and pressing against the inside of the opening. Also, a collar 34 mates with an externally threaded portion of the stem and presses upward against the bottom of the case 12 to secure the stem in position.

The socket member 30 includes a base portion 36 and an upper back portion 38. The base portion is provided with a pair of outwardly extending lugs 40 and 42 which are secured to the back of the case 12 by screws 44 and 46, respectively. The upper portion 38 is also secured to the back of the case by a screw 48. Thus positioned, the socket member 30 provides support for a dial plate 40 and the Bourdon tube 26. In particular, the dial plate 40 is connected to the front of the base 36 by a pair of screws 52 and has a pressure indicating scale printed on its front face. The dial plate also carries a stop pin 54 against which a needle 56 is adapted to rest during conditions of zero pressure as will be described later.

The Bourdon tube 26 is of an arcuate C-shape design having its open end 48 seated within the base portion 36 of the socket member 30 to communicate with a bore 40 extending upward through the stem 28. Fluid, the pressure of which is to be measured, is thus connected through the bore 60 to the interior of the Bourdon tube 26 when the socket member is connected to the line being monitored.

The other end of the Bourdon tube 26 is sealed, as indicated at 62, and is provided with an extension 64. The extension 64 is linked to a transmission mechanism 66, a preferred form of which is to be described. With this arrangement, variations in the pressure of the fluid supplied to the gauge cause the Bourdon tube to straighten or contract and curl, thereby producing arcuate movement of the free end of the Bourdon tube to provide an indication of the pressure of the fluid.

Figure 4:
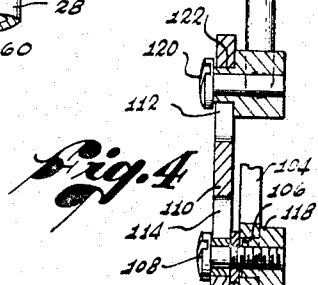
FIGURE 4 is a sectional view of the linkage assembly for the gauge taken along the line 4—4 in FIGURE 2.

As illustrated most clearly in FIGURES 3 and 4, the transmission mechanism 66 is carried by a back mounting plate 68. The plate 68 is connected to the upper portion 38 of the socket member 30 by a pair of screws 70 and 72 extending through elongated arcuate slots 74 and 76, respectively. In this manner, the initial position of the mounting plate 68 can be adjusted to preadjust the position of the transmission mechanism within the case 12.

Extending forward from the mounting plate 68 are a pair of spacers 78 and 80. A second mounting plate 82 is secured to the forward ends of the spacers by screws 84 and 86.

Thus arranged, the pair of mounting plates 68 and 82 provide means for supporting a gauge needle carrying shaft 88 and a sector gear 90. The rear end of the shaft 88 is bearing mounted to the plate 68 and extends forward through a hole in the mounting plate 82 and an opening 92 in the dial plate 60 to rigidly support the needle 56 at its forward end for movement over the scale.

Mounted rigidly on the shaft 88 between the dial plate 40 and the mounting plate 82 is a damping disc 94 having a plurality of spaced holes 96 therein. The damping disc 94 coacts with the fluid 18 to oppose and dampen rotation of the shaft 88.

Also carried on the shaft 88 between the mounting plates 48 and 82 is a pinion gear 98. The pinion gear 98 meshes with the sector gear 100 such that a turning of the sector gear produces rotation of the pinion, shaft 88, damping disc 94 and needle 56.

The sector gear 90 is mounted upon a spindle 102 passing through aligned holes in the mounting plates 48 and 82 and is provided with a tail portion 104 remote from the gear teeth. The tail portion includes an elongated arcuate slot 106 for receiving a screw 108 which connects the tail portion to a linkage arm 110 extending from the extension 64 of the Bourdon tube 28.

Figure 5:
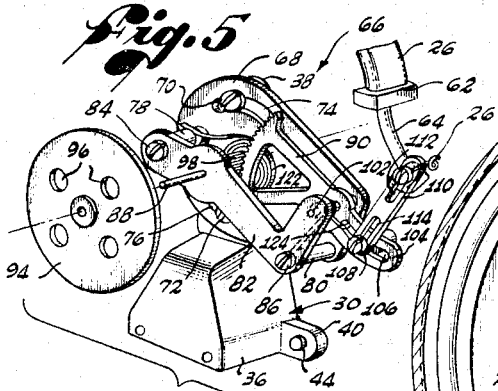
FIGURE 5 is an expanded perspective view of the actuating mechanism for the gauge.
Figure 2:
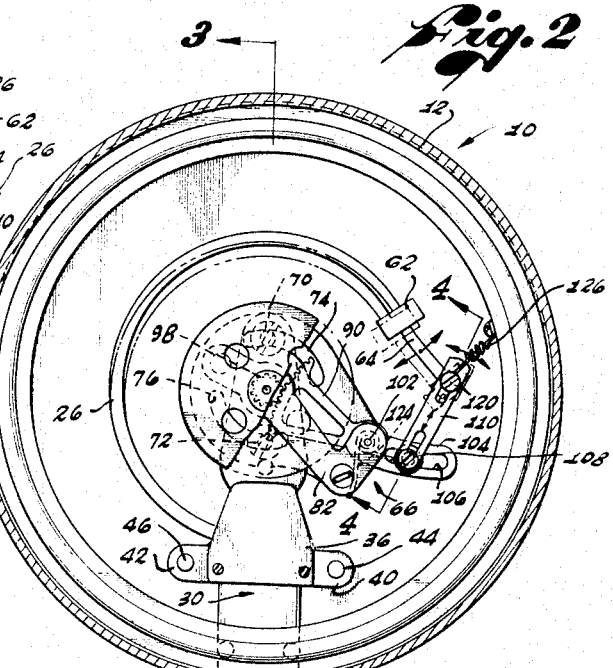
FIGURE 2 is a sectional front view of the pressure gauge illustrated in FIGURE 1, showing the internal construction of the gauge.

More particularly, and as most clearly shown in FIGURES 2, 4 and 5, the linkage arm 110 includes upper and lower elongated slots 112 and 114. The screw 108 passes through the elongated slot 114, a washer 116, and into the elongated slot 106 where it is tightly held in place by a nut 118. By loosening the nut 118, the position of the screw 108 within the slot 106 may be selectively adjusted to preset the position of the sector gear relative to the Bourdon tube. The connection of the screw and the linkage arm 110, however, is such that the screw is free to ride up and down in the elongated slot 114.

A similar connection is provided at the upper end of the linkage arm 110 to the extension 64 (see FIGURE 4). In particular, a screw 120 passes through the elongated slot 112 and into the tip portion of the extension 64 to secure a forward extending collar 122 for sliding movement within the elongated slot 118. In this manner, the linkage arm 110 together with the screws 108 and 120 provide a loose coupling between the Bourdon tube 28 and the transmission mechanism 66. The loose linkage connection or coupling allows the closed end of the Bourdon tube a predetermined amount of free movement independent of the transmission mechanism.

Under zero pressure conditions, the needle carrying shaft 88 is rotated by a hair spring 122 to bring the needle 56 to rest against the stop pin 54. For this purpose, one end of the hair spring is secured to the shaft 88 and the other end to the spacer 78. The initial rotary positioning of the shaft 88 under zero pressure conditions is also aided by a spring wire 124 which normally urges the sector gear 90 to rotate in a counterclockwise direction. To this end, the wire 124 is wound around the spindle 102 with one end connected to the spacer 80 and the other end extending into the elongated slot 106.

Also under zero pressure conditions, the closed end of the Bourdon tube 26 is urged to predetermined position within the case by a coil spring 126. The coil spring 126 is connected to the extension 64 at the closed end of the tube and to the side of the case 12 adjacent the extension. Thus arranged, the coil spring draws the closed end of the Bourdon tube toward the outside of the case, thereby normally causing the screws 108 and 120 to engage opposing ends of the elongated slots 112 and 114 in the linkage arm 110 (see FIGURE 2).

When the pressure of fluid being monitored increases, the Bourdon tube 26 is caused to become circular in cross section and straighten. This movement is initially opposed by the spring 124 and the fluid 18 within the case. If this change in pressure occurs relatively slowly, the gauge responds similarly to a conventional Bourdon tube pressure gauge. The movement of the closed end of the Bourdon tube toward the outside of the case causes the linkage arm 110 to turn the sector gear 90 in a counterclockwise direction. This, in turn, produces a clockwise rotation of the pinion 98, needle carrying shaft 88, needle 56, and disc 94. The rotation of the shaft is opposed by the fluid 18 which coacts with the disc 94 and the openings therein to resist change in the rotational position of the disc. While the shaft 88 and needle turn relatively slowly to bring the needle to a position over the scale accurately indicating the pressure of the fluid applied to the gauge, the reaction is sufficiently fast to allow the pointer to follow the pressure change. In effect, because the change in pressure is slow, the damping disc 94 has little or no effect on the gauge reading.

If the increase in the fluid pressure applied to the gauge is sudden, however, the damping disc 94 reacts with the fluid 18 to prevent rapid movement of the shaft 88 and the needle 56.

Further, because of the loose linkage coupling between the Bourdon tube and the transmission mechanism, if a sudden pressure decrease then occurs, the shaft 88 is permitted to initially stand still under the action of the damping disc while the Bourdon tube reacts to the change in fluid pressure. However, once the designed range of free movement of the Bourdon tube, provided by the loose linkage coupling, is exceeded, the screws 108 and 120 engage the upper and lower ends of the elongated slots in the linkage arm and the force of the tube tends to produce a clockwise turning of the sector gear and a counterclockwise rotation of the shaft 88. The disc 94 and fluid 18 then coact to oppose the counterclockwise rotation of the shaft 8 and needle 56.

Thus, under fluctuating or surging pressure conditions, the coaction between the disc, fluid and loose linkage coupling allows little variation to occur in the position of the needle which continues to follow and indicate the average value of fluid pressure applied to the gauge. Moreover, the coaction between the disc, fluid, and loose linkage connection virtually eliminates unnecessary wear of the mechanism which would otherwise be caused by the sudden fluctuation of fluid pressure. This protective and dampening operation of the fluid, disc and linkage connection, of course, occurs when the fluid pressure being monitored abruptly increases from a predetermined pressure other than zero as well as when a sudden pressure decrease appears in the fluid pressure followed by a pressure increase.

In addition to its damping function, the fluid 18 prevents the parts from being corroded, as is common in conventional pressure gauges which expose the moving parts to air.

From the foregoing, it is appreciated that the present invention provides an improved Bourdon tube pressure gauge which is dampened so as to give an average reading of a fluctuating pressure and which protects the mechanism from the severe wear on the parts which would otherwise occur. The device is thus ideal for use in pumping systems or the like wherein surging and oscillating conditions are present and is also well adapted for high pressure systems where the wear of the parts would produce substantial inaccuracy in the gauge readings.

In the foregoing, a particular damping mechanism has been described in combination with a Bourdon tube. It is, of course, appreciated that the damping mechanism is equally useful in pressure gauges employing a different type of deformable pressure sensing element, such as a diaphragm or bellows, connected by a transmission to a needle carrying shaft. Also, in the foregoing, a particular form of pulsation dampened Bourdon tube gauge has been described in some detail. Changes and modifications, of course, may be made in the illustrated form without departing from the spirit of the present invention. In view of the different forms of pressure sensing elements which may be employed as well as the possible changes in the illustrated form, it is intended that the present invention be limited in scope only by the terms of the following claim.

I claim:

A pressure gauge comprising:
- a case;
- a Bourdon tube mounted within said case;
- a gauge needle carrying shaft;
- gear means for turning to rotate said shaft;
- transmission means for turning said gear means in response to movement of said Bourdon tube comprising a pin on the free end of said Bourdon tube and a linkage arm connected at one end to said gear means and including an elongated slot in its other end freely receiving said pin; spring means having one end connected to the pin and the other end affixed to the wall of the housing to urge the pin to the top end of the slot;
- fluid in said case submerging said shaft, Bourdon tube and transmission means;
- and a disc carried by said shaft for rotation therewith and including a plurality of holes coacting with said fluid to oppose and dampen rotational movement of said shaft.

References Cited

UNITED STATES PATENTS

| | | | |
|---|---|---|---|
| 440,151 | 11/1890 | Heinz | 73—430 |
| 1,322,463 | 11/1919 | Nelson | 73—414 X |
| 2,125,016 | 7/1938 | Gruver | 73—414 |
| 2,291,612 | 8/1942 | Draper | 33—204 |
| 2,679,758 | 6/1954 | Lamb et al. | 73—430 X |
| 2,701,968 | 2/1955 | Brown | 73—414 |
| 3,214,979 | 11/1965 | Bissell et al. | 73—418 |
| 3,257,852 | 6/1966 | Perkins | 73—414 |

FOREIGN PATENTS

| | | |
|---|---|---|
| 243,387 | 7/1962 | Great Britain. |

LOUIS R. PRINCE, *Primary Examiner.*

D. O. WOODIEL, *Assistant Examiner.*